United States Patent
Sakamoto et al.

(10) Patent No.: US 8,573,007 B2
(45) Date of Patent: Nov. 5, 2013

(54) PROCESS FOR PRODUCING MOLTEN GLASS, GLASS-MELTING FURNACE, PROCESS FOR PRODUCING GLASS PRODUCTS AND APPARATUS FOR PRODUCING GLASS PRODUCTS

(75) Inventors: Osamu Sakamoto, Tokyo (JP); Chikao Tanaka, Tokyo (JP); Seiji Miyazaki, Tokyo (JP); Satoru Ohkawa, Tokyo (JP); Takahiro Murakami, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 5 days.

(21) Appl. No.: 13/370,820

(22) Filed: Feb. 10, 2012

(65) Prior Publication Data

US 2012/0137737 A1 Jun. 7, 2012

Related U.S. Application Data

(63) Continuation of application No. PCT/JP2010/063722, filed on Aug. 12, 2010.

(30) Foreign Application Priority Data

Aug. 17, 2009 (JP) .................................. 2009-188348

(51) Int. Cl.
*C03B 5/235* (2006.01)
*C03B 5/02* (2006.01)
*C03B 3/00* (2006.01)

(52) U.S. Cl.
USPC .......... 65/335; 65/135.9; 65/136.2; 65/29.13; 65/66

(58) Field of Classification Search
USPC .......... 65/135.9, 29.13, 29.16, 136.2, 335, 66
See application file for complete search history.

(56) References Cited

U.S. PATENT DOCUMENTS

| 3,337,324 | A | * | 8/1967 | Cable, Jr. et al. | 65/136.3 |
| 3,929,445 | A | * | 12/1975 | Zippe | 65/335 |
| 3,980,460 | A | * | 9/1976 | Nelson et al. | 65/29.16 |
| 2009/0064716 | A1 | | 3/2009 | Sakamoto et al. | |

FOREIGN PATENT DOCUMENTS

| JP | 59-006253 | 2/1984 |
| JP | 2006-199549 | 8/2006 |
| JP | 2007-297239 | 11/2007 |

OTHER PUBLICATIONS

U.S. Appl. No. 13/463,193, filed May 3, 2012, Sakamoto, et al.
U.S. Appl. No. 13/335,054, filed Dec. 22, 2011, Sakamoto.
U.S. Appl. No. 13/342,565, filed Jan. 3, 2012, Sakamoto, et al.
U.S. Appl. No. 13/346,192, filed Jan. 9, 2012, Sakamoto, et al.
U.S. Appl. No. 13/357,117, filed Jan. 24, 2012, Sakamoto, et al.
U.S. Appl. No. 13/396,768, filed Feb. 15, 2012, Sakamoto, et al.
International Search Report issued Oct. 12, 2010 in PCT/JP2010/063722 filed Aug. 12, 2010.

* cited by examiner

*Primary Examiner* — Queenie Dehghan
(74) *Attorney, Agent, or Firm* — Oblon, Spivak, McClelland, Maier & Neustadt, L.L.P.

(57) ABSTRACT

The present invention provides a process for producing a molten glass which can produce a molten glass having a good quality, a glass-melting furnace, a process for producing glass products and an apparatus for producing glass products. While an oxygen combustion burner 20 is rotated by a motor 38, glass raw material particles (not shown) are dropped into a high-temperature gas phase atmosphere produced by a flame F of the oxygen combustion burner 20, to be changed into liquid glass particles. By rotation of an outlet (nozzle) of the oxygen combustion burner 20, the falling position of the liquid glass particles 26, changes with time. Accordingly, generation of bubbles caused by continuous fall of the liquid glass particles in a particular position on a molten glass liquid surface is prevented. Accordingly, it is possible to produce a molten glass having a good quality with few bubbles.

6 Claims, 6 Drawing Sheets

PROCESS FOR PRODUCING MOLTEN GLASS, GLASS-MELTING FURNACE, PROCESS FOR PRODUCING GLASS PRODUCTS AND APPARATUS FOR PRODUCING GLASS PRODUCTS

TECHNICAL FIELD

The present invention relates to a glass-melting furnace for producing liquid glass particles from glass raw material particles in a high temperature gas phase atmosphere, to produce molten glass; a process for producing molten glass employing the glass-melting furnace; an apparatus for producing glass products employing the melting furnace; and a process for producing glass products using the above process.

BACKGROUND ART

Patent Documents 1 and 2 each discloses as a glass-melting furnace for melting glass raw material particles in a high temperature gas phase atmosphere and accumulating them to produce a molten glass liquid, a glass-melting furnace having a glass raw material particle feed portion and a heating means for forming a high temperature gas phase atmosphere for melting the glass raw material particles in the ceiling portion of the glass-melting furnace.

This glass-melting furnace is an apparatus for melting glass raw material particles, that are fed from the glass raw material particle feed portion into the inside of the furnace, in a high temperature gas phase atmosphere heated by a heating means, to produce liquid glass particles, accumulating the liquid glass particles in a bottom portion of the glass-melting furnace to form molten glass liquid, temporarily storing the molten glass liquid in the bottom portion of the glass-melting furnace, and discharging the molten glass liquid. Further, such a production process of molten glass is known as in-flight glass melting method. In this in-flight glass melting method, as compared with a conventional melting method using a Siemens type furnace, it is possible to reduce consumption of energy in glass-melting step to be about one thirds and to produce molten glass in a short time, and accordingly, it is possible to downsize a melting furnace, omit a regenerator, improve quality, reduce $CO_2$ and to shorten a time for changing glass type. Such an in-flight glass melting method of glass is attentioned as a technique for saving energy.

By the way, as the glass raw material particles fed from the glass-raw material particle feed portion, one comprising a mixture of glass raw materials and granulated into a particle size of at most 1 mm, is commonly employed. Each particle of the glass raw material particles fed into the glass-melting furnace is melted to be a liquid glass particle while it falls (flies) in a high temperature gas phase atmosphere, and such liquid glass particles fall downwardly and are accumulated in the bottom portion of the glass-melting furnace to form a molten glass liquid. The liquid glass particles produced from the glass raw material particles may be expressed as drops of molten glass. In order to produce the liquid glass particles from the glass raw material particles in the high temperature gas phase atmosphere in a short time, the particle size of the glass raw material particles has to be small as described above. Further, usually, each liquid glass particle produced from each glass raw material particle needs to be a particle having substantially the same glass composition.

Almost all of decomposed gas components, that are generated when the glass raw material particles become liquid glass particles, are discharged to the outside of the molten glass particles without being contained in the molten glass particles since both of the glass raw material particles and the liquid glass particles are small particles. Accordingly, there is little risk that bubbles are formed in the molten glass liquid produced by accumulating the liquid glass particles.

Meanwhile, the glass raw material particles are particles having substantially uniform components, and glass compositions of liquid glass particles produced from the glass raw material particles are uniform from one another. Since the difference of glass composition among the liquid glass particles is small, there is little risk that glass composition is different between portions of molten glass liquid produced by accumulation of a large number of the liquid glass particles. Accordingly, a homogenizing means for homogenizing the glass composition in molten glass liquid, that has been required in conventional glass-melting furnaces, is scarcely required in in-flight glass melting method. Even if a small amount of liquid glass particles are different from the rest of liquid glass particles in the glass composition, since the molten glass particles are small in the particle size, a heterogeneous region of molten glass liquid, that is produced from the small amount of molten glass particles having different glass composition, is small and such a region is easily homogenized and disappears in a short time. Thus, with the in-flight glass melting method, it is possible to reduce heat energy required to homogenize molten glass liquid and to shorten a time required for homogenization.

The glass-melting furnaces of Patent Documents 1 and 2 each has a plurality of arc electrodes and/or oxygen combustion nozzles as heating means for forming a high-temperature gas phase atmosphere, and a high-temperature gas phase atmosphere of at least 1,600° C. is formed in the furnace by a thermal plasma arc formed by the plurality of arc electrodes and/or oxygen combustion flames formed by the oxygen combustion nozzles. By feeding glass raw material particles into the high-temperature gas phase atmosphere, the glass raw material particles are changed to liquid glass particles in the high temperature gas phase atmosphere. Further, as glass raw material particles employed in Patent Document 1, ones having a particle size of at most 0.5 mm (weight-averaged) are employed for the reason that they can be changed into liquid glass particles in a short time and dissipation of generated gases is easy. Further, from the viewpoints of cost increase for reduction of the particle size of the glass raw material particles and reduction of the glass composition variation among generated liquid glass particles, ones having a particle size of at least 0.01 mm (weight-averaged) are employed.

The molten glass of about 1,600° C. produced by the glass-melting furnace of Patent Document 1 or 2 is supplied from the glass-melting furnace to a temperature conditioning tank or a refining tank, and is cooled to a temperature at which the glass is formable (about 1,000° C. in a case of soda lime glass). Then, this molten glass is supplied to a forming means of glass products such as a float bath, a fusion forming machine, a roll out forming machine, a blow forming machine or a press forming machine, and formed into glass products having various shapes. Then, the formed glass products are cooled to an approximate room temperature by an annealing means, and thereafter, subjected to a cutting step by a cutting means and/or other back-end steps as the case requires, to produce desired glass products.

PRIOR ART DOCUMENTS

Patent Documents

Patent Document 1: JP-A-2006-199549
Patent Document 2: JP-A-2007-297239

DISCLOSURE OF INVENTION

Technical Problem

In the in-flight melting facility disclosed in Patent Documents 1 and 2, liquid glass particles fallen on molten liquid glass surface are taken into the molten glass liquid that has been melted earlier, and the melt further proceeds to produce a molten glass containing no unmelted material.

However, when liquid glass particles continuously fall on the same position on the surface of the molten glass liquid, a gas such as an air present in the glass-melting furnace tends to be involved in the liquid glass particles or the molten glass liquid, which may cause to produce bubbles. Bubbles produced at a time of fall of the liquid glass particles are bubbles produced by a gas such as an air or a combustion gas involved between the liquid glass particles or between the liquid glass particles and the molten glass liquid. For example, before a substantially spherical liquid glass particle that has fallen into contact with a surface of the molten glass liquid is integrated into the molten glass liquid to form a flat surface, another liquid glass particle may fall onto the unflattened liquid glass particle to involve a gas such as an air between such both liquid glass particles or between such both liquid glass particles and the surface of the molten glass liquid in some cases.

Here, as bubbles formed by contact of the liquid glass particles with the molten glass liquid surface, although the possibility is low, in a case where liquid glass particle that has just melted in a high temperature gas atmosphere contains e.g. a residual gas, the residual gas contained in the liquid glass particle may form a bubble when other liquid glass particles overlap with the liquid glass particle containing the residual gas, just before or just after it contacts with the molten glass liquid to be integrated with the molten glass liquid.

Thus, in the production apparatuses of Patent Documents 1 and 2, there has been a demerit that it is not possible to produce a molten glass having a good quality having no bubble in some cases.

Further, Patent Document 2 discloses a technique of periodically stirring a liquid surface of molten glass to diffuse molten glass liquid particles fallen into the molten glass liquid surface, but when the liquid surface is stirred, there has been a problem that air and residual gas taken into the molten glass liquid is diffused to be contained in the molten glass despite the intention, which may lower the degassing efficiency and prevent production of molten glass having a good quality in some cases.

The present invention has been made under the circumstances, and it is an object of the present invention to provide a process for producing molten glass, a glass-melting furnace, a process for producing glass products and an apparatus for producing glass products, which can produce a molten glass having a good quality.

Solution to Problem

In order to achieve the above objects, the present invention provides a process for producing molten glass, which is a process of changing glass raw material particles into liquid glass particles in a gas phase atmosphere in a glass-melting furnace and accumulating the liquid glass particles in a bottom portion of the glass-melting furnace to obtain a molten glass liquid; the process comprising: supplying the glass raw material particles downwardly from a furnace wall portion in an upper portion of the glass-melting furnace to let the particles pass through a gas phase portion formed by a heating means; to change the particles into liquid glass particles and changing with time the position of the gas phase portion in substantially horizontal direction and thereby changing with time the falling position of the liquid glass particles formed in the gas phase portion on the molten glass liquid surface. Here, "changing with time the falling position" means moving the position to which the liquid glass particles fall to contact with the molten glass liquid surface. Here, the liquid glass particles may fall on the same position again after a time interval.

In the production process of the present invention, since the falling position of the liquid glass particles on the molten glass liquid surface is changed with time, the liquid glass particles do not fall on the same position of the molten glass liquid surface continuously, and it is possible to prevent a gas such as an air from being involved in the molten glass liquid at the falling position of the liquid glass particles. Further, since the liquid glass particles do not fall on the same position on the molten glass liquid surface continuously, even if the air or the residual gas is taken into the molten glass liquid to form bubbles, it is easy to have a time for degassing, and it is possible to produce a molten glass having a good quality with little bubbles.

The time interval until the liquid glass particles fall on the same position on the molten glass liquid surface again, changes depending on the composition of a glass to be produced, the type of glass raw material, the feeding amount of glass raw material particles, the temperature of gas phase portion formed by heating means and other conditions of in-flight melting. Accordingly, an optimum time interval for not involving a gas may be set according to appropriate observation of molten glass liquid surface, or the time interval may be changed appropriately according to the observation result.

In the production method of the present invention, the heating means is preferably moved in substantially horizontal direction. By this movement of the heating means, it is possible to move the position of the gas phase portion formed by the heating means in substantially horizontal direction with time. Further, even in a case where the heating means is fixed, it is possible to move the position of the gas phase portion formed by the heating means in substantially horizontal direction with time. For example, when the heating means is an oxygen combustion burner constituted by a combustion gas supply tube, an oxygen tube and a glass raw material particle supply tube, that are coaxially arranged, even if a main unit of the oxygen combustion burner is fixed, the position of a flame (gas phase portion) formed at a forward position of the outlet (nozzle) is movable in substantially horizontal direction with time by moving the outlet (nozzle) of the oxygen combustion burner in substantially horizontal direction.

Thus, by moving the position of the gas phase portion in substantially horizontal direction, it is possible to change the falling position of the liquid glass particles formed in the moving gas phase, with time. In this case, the feeding position into the gas phase portion of the glass raw material particles supplied downwardly from a furnace wall portion in the upper portion of the glass-melting furnace, preferably moves according to the movement of the gas phase portion. Further, when the heating means is an oxygen combustion burner constituted by a combustion gas supply tube, an oxygen tube and a glass raw material particle supply tube, that are coaxially arranged, it is possible to feed the glass raw material particles into the moving flame (gas phase portion) by feeding the glass raw material particles from the outlet (nozzle) of the oxygen combustion burner into the flame.

Further, in the production process of the present invention, by providing a plurality of gas phase portions at respective horizontal positions and feeding glass raw material particles into the respective gas phase portions in a predetermined order, that is, by forming gas phase portions into which the glass raw material particles are fed and gas phase portions into which the glass raw material particles are not fed are formed and changing with time the gas phase portions into which the glass raw material particles are fed, it is possible to change with time the falling position of the liquid glass particles formed in the gas phase portions into which the glass raw materials are fed. In this case, a gas phase portion in a timing in which no glass raw material particles are fed is not necessarily formed. Namely, since the gas phase portion is formed by the heating means, by stopping the operation of the heating means for forming the gas phase portion in a timing in which no glass raw material particles are fed, it is possible to stop formation of the gas phase portion to be formed by the heating means. In a timing in which the glass raw material particles are to be fed, the heating means is operated to form the gas phase portion. Here, in the timing in which the gas phase portion is not formed, the glass raw material particles are not supplied to the position.

In the production process of the present invention, as described above, it is also preferred that a plurality of heating means for forming gas phase portions are provided at respective positions in the horizontal direction, and that the heating means are operated at different timings. As described later, the glass raw material particle feed portion and the heating means are preferably combined to form a group (glass raw material particle heating unit to be described later). By operating this glass raw material particle heating unit, it is possible to carry out feeding of the glass raw material particles into the gas phase portion and formation of the gas phase portion by the heating means simultaneously. Accordingly, by providing a plurality of glass raw material particle heating unit at respective positions in the horizontal direction and sequentially operating these units, it is possible to change the reaching position of the liquid glass particles with time.

Further, in order to achieve the above objects, the present invention provides a glass-melting furnace for changing glass raw material particles into liquid glass particles in a gas phase atmosphere in the glass-melting furnace, accumulating the liquid glass particles in a bottom portion of the glass-melting furnace to obtain a molten glass liquid and discharging the molten glass liquid; the furnace comprising a glass raw material particle feed portion disposed downwardly from a furnace wall portion in an upper portion of the glass-melting furnace; a heating means for forming a gas phase portion under the glass raw material particle feed portion for changing the glass raw material particles into liquid glass particles; a moving means for moving the gas phase portion in substantially horizontal direction; a furnace bottom portion for accumulating the liquid glass particles to form a molten glass liquid; and a discharge portion for discharging the molten glass liquid.

Here, the furnace wall portion in the upper portion of the glass-melting furnace in the above construction means a ceiling portion of the glass-melting furnace or a side wall within 1 m from an inner wall of the ceiling portion.

In the glass-melting furnace of the present invention, by providing a moving means for moving the gas phase portion in substantially horizontal direction, it is possible to move the gas phase portion in substantially horizontal direction, and to change the falling position of the liquid glass particles formed in the gas phase portion in horizontal direction. Accordingly, since the liquid glass particles do not fall continuously on a particular position on the molten glass liquid surface formed in the furnace bottom portion, it is possible to prevent a gas such as an air from being involved into the molten glass liquid at the falling position of the liquid glass particles. Further, since the liquid glass particles do not fall continuously on a particular position on the molten glass liquid surface formed in the furnace bottom portion, even if the air or a residual gas is taken into the molten glass liquid to form bubbles, it is easy to obtain a time for degassing, whereby it is possible to produce a molten glass having a good quality with few bubbles.

The moving means of the gas phase portion is preferably a moving means for moving the heating means in substantially horizontal direction. Further, even in a case where the heating means is fixed, the moving means is preferably a moving means for changing with time the position of the gas phase portion formed by the heating means in substantially horizontal direction. For example, in a case where the heating means is an oxygen combustion burner constituted by the combustion gas supply tube, an oxygen tube and a glass raw material particle supply tube, that are coaxially arranged, even if the oxygen combustion burner main unit is fixed, it is possible to change with time the position of a flame (gas phase portion) formed at a forward position of the outlet (nozzle) of the burner in substantially horizontal direction by employing a moving means for moving the outlet (nozzle) of the oxygen combustion burner in substantially horizontal direction.

Thus, by employing the moving means for moving the gas phase portion in substantially horizontal direction, it is possible to change with time the falling position of the liquid glass particles formed in the moving gas phase portion. In this case, the glass raw material particle feed portion disposed downwardly from a furnace wall portion in the upper portion of the glass-melting furnace, preferably moves according to movement of the gas phase portion. Further, in a case where the heating means is an oxygen combustion burner constituted by a combustion gas supply tube, an oxygen tube and a glass raw material particle supply tube, that are coaxially arranged, when the outlet (nozzle) of the oxygen combustion burner is integrated with the outlet of the glass raw material particle feed portion, it is possible to feed glass raw material particles into a flame (gas phase portion) moving by the moving means.

Further, in order to achieve the above objects, the present invention provides a glass-melting furnace for changing glass raw material particles into liquid glass particles in a gas phase atmosphere in the glass-melting furnace, accumulating the liquid glass particles to obtain a molten glass liquid and discharging the molten glass liquid; the glass-melting furnace comprising a plurality of groups each consisting of the following glass raw material particle feed portion and the following heating means, that are disposed at respective horizontal positions: a glass raw material particle feed portion disposed downwardly from a furnace wall portion in an upper portion of the glass-melting furnace; and a heating means for forming a gas phase portion under the glass raw material particle feed portion for changing the glass raw material particles into liquid glass particles; the glass-melting furnace further comprising: an operation controller for operating the plurality of the groups at different timing; a furnace bottom portion for accumulating the liquid glass particles to form a molten glass liquid; and a discharge portion for discharging the molten glass liquid.

Here, the furnace wall portion in the upper portion of the glass-melting furnace means a ceiling portion of the glass-melting furnace and a side wall within 1 m from an inner wall of the ceiling portion.

In the second glass-melting furnace of the present invention, by providing a plurality of groups such as glass raw material particle heating units to be described later at respective positions in substantially horizontal direction, and by operating the plurality of groups at respective timings by an operation controller, it is possible to change with time the falling position of the liquid glass particles in the horizontal direction. In this construction, in the same manner as the first glass-melting furnace of the present invention described above, since liquid glass particles do not fall continuously on a particular position on the molten glass liquid surface formed in the furnace bottom portion, it is possible to prevent a gas such as an air from being involved into the molten glass liquid at the falling position of the liquid glass particles. Further, since the liquid glass particles do not fall continuously on a particular position on the molten glass liquid surface, even if an air or a residual gas is taken into the molten glass liquid, it is easy to obtain a time for degassing, whereby it is possible to produce a molten glass having a good quality with few bubbles.

In the production process or the melting furnace for molten glass of the present invention, the heating means is preferably at least one selected from an oxygen combustion burner for generating an oxygen combustion flame and a multiphase arc plasma generation apparatus constituted by at least one pair of electrodes for generating thermal plasma.

In the present invention, a high temperature gas phase atmosphere of about 2,000° C. can be formed in the case of the oxygen combustion flame by the oxygen combustion burner, and a high temperature gas phase atmosphere of from 5,000 to 20,000° C. can be formed in the case of thermal plasma. Accordingly, it is possible to melt glass raw material particles falling in the high temperature gas phase atmosphere in a short time to change them into liquid glass particles. Here, the oxygen combustion burner and the multiphase arc plasma generation apparatus may be each disposed alone, or may be used both of them in combination. Here, as the oxygen combustion burner to be employed as the heating means, a burner integrated with the glass raw material particle feed portion may be employed.

In order to achieve the above objects, the present invention provides a process for producing glass products comprising a step of producing molten glass by any one of the processes for producing molten glass of the present invention, a step of forming the molten glass, and a step of annealing the formed glass.

Further, in order to achieve the above objects, the present invention provides an apparatus for producing glass products, comprising any one of the glass-melting furnaces of the present invention, a forming means for forming a molten glass, which is provided on the downstream side of the discharge portion of the glass-melting furnace, and an annealing means for annealing the formed glass.

Advantageous Effects of Invention

As described above, in the process for producing molten glass and the glass-melting furnace of the present invention, since it is possible to obtain a time for liquid glass particles fallen on the stored molten glass surface to become flat, and a time for bubbles generated by a gas taken into the molten glass by the fall of the particles to be degassed or broken, it is possible to reduce bubbles formed in the molten glass liquid by the fall of the liquid glass particles on the molten glass liquid surface, and it is easy to remove the formed particles. Accordingly, it is possible to produce a molten glass having a good quality with few bubbles.

Further, in the process for producing glass products and the apparatus for producing glass products of the present invention, since it is possible to produce a molten glass having a good quality with few bubbles by the process for producing molten glass and the glass-melting furnace of the present invention, it is possible to produce glass products having a good quality.

DESCRIPTION OF EMBODIMENTS

Now, preferred embodiments of the process for producing molten glass, the glass-melting furnace, the process for producing glass products and the apparatus for producing glass products of the present invention will be described with reference to attached drawings.

In the illustrated glass-melting furnace, a heating means for forming a gas phase portion comprises an oxygen combustion burner. The gas phase portion is constituted by the inside of a flame of oxygen combustion burner and a high-temperature portion in the vicinity of the flame.

A glass raw material particle feed portion for supplying glass raw material particles to the gas phase portion is integrated with the oxygen combustion burner, and a tube for supplying a combustion gas, a tube for supplying oxygen and a tube for supplying glass raw material particles are coaxially provided in the vicinity of the outlet of the oxygen combustion burner. This combination of the glass raw material particle feed portion and the oxygen combustion burner is referred to as glass raw material particle heating unit.

Figure 1:
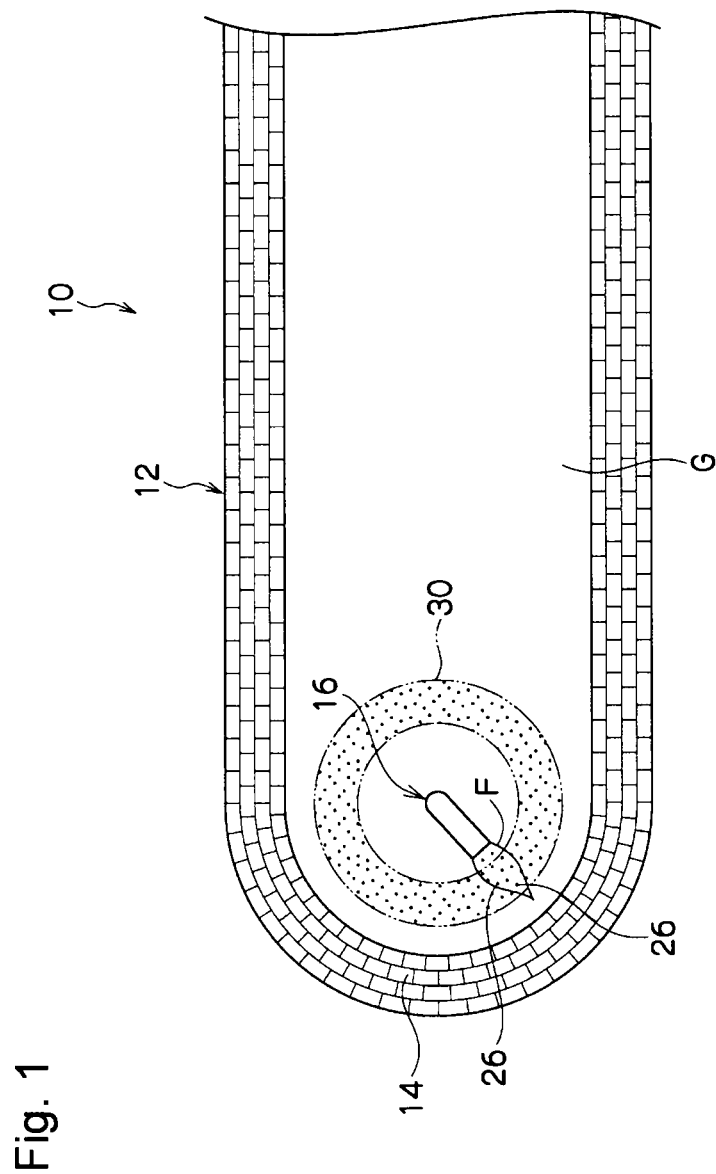
FIG. 1 is a substantial-part plan view of a glass-melting furnace constituting an apparatus for producing glass products of the present invention.
Figure 2:
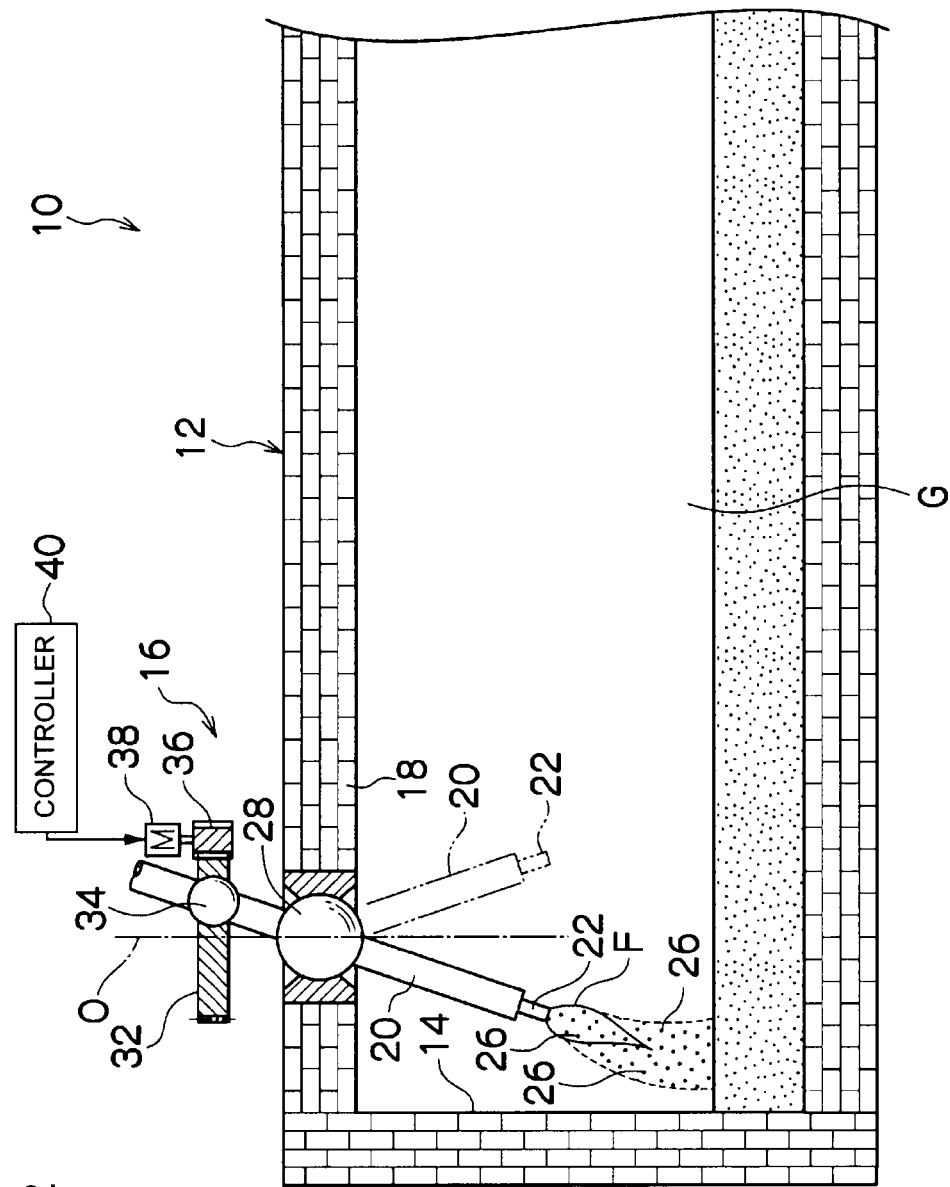
FIG. 2 is a vertical cross-sectional view of the glass-melting furnace shown in FIG. 1.

FIG. 1 is a substantial-part plan view of a glass-melting furnace 10 of a first embodiment constituting an apparatus for producing glass products of the present invention, and FIG. 2 is a vertical cross-sectional view of the glass-melting furnace 10.

As shown in FIG. 1, the glass-melting furnace 10 has a melting tank 12 and an outlet (discharge portion: not shown in the figure) being a discharge portion of molten glass liquid G, and the melting tank 12 and the outlet are constituted by known refractory bricks. Further, on a ceiling wall 18 being a furnace wall portion in the upper portion of the melting tank 12, one glass raw material particle heating unit 16 is disposed, whereby a high-temperature gas phase portion for changing glass raw material particles into liquid glass particles is formed in the in-furnace gas phase atmosphere.

Accordingly, in the melting tank 12, the glass raw material particle heating unit 16 is disposed on the upstream side in the flow direction of molten glass liquid G. The homogeneity of the molten glass liquid G produced by accumulation of liquid glass particles at a position under the glass raw material particle heating unit 16, increases as the molten glass liquid G flows to the downstream side. Further, the molten glass is cooled to a predetermined temperature, and supplied to a forming apparatus of glass products. The melting tank 12, the outlet and a degassing tank are constituted by known refractory bricks. Further, the glass raw material particle heating unit 16 is provided downwardly so as to penetrate through a flat ceiling wall 18 of the melting tank 12. This glass raw material particle heating unit 16 will be described later.

Here, the shape of the melting tank is not limited to a rectangular solid shape, but it may be a cylindrical shape in elevation view. Further, it is assumed that the ceiling wall 18 of the melting tank 12 has a flat shape, but the construction is not limited thereto, and it may have an arch shape or a dome shape, etc.

Further, a case where the glass raw material particle heating unit 16 is not disposed on the ceiling wall 18 but on a side wall in the upper portion of the melting tank 12, is also within the scope of the present invention. In the case where the glass raw material particle heating unit 16 is provided on the side wall, the glass raw material particle heating unit 16 is provided on the side wall at a height within 1 m in the vertical direction from the inner wall of the ceiling wall 18 of the melting tank 12. This is because if the glass raw material particle heating unit 16 is provided at a position exceeding 1 m in the vertical direction from the inner wall of the ceiling wall 18 of the melting tank 12, the vertical distance from the molten glass liquid surface becomes so small that the angle of the glass raw material particle heating unit 16 to the horizontal direction becomes small, and accordingly, the glass raw material particles are blown against an opposed wall face, whereby corrosion of the wall face and contamination of glass caused by the corrosion occur. The glass raw material particle heating unit 16 is preferably provided at a height within 90 cm, more preferably at a height within 50 cm in the vertical direction from the inner wall of the ceiling wall 18 of the melting tank 12.

As the glass raw material particle heating unit 16, as described above, an oxygen combustion burner 20 wherein the glass raw material particle feed portion is integrated with the heating means is employed.

The oxygen combustion burner 20 is an oxygen combustion burner wherein supply nozzles of a raw material, a fuel and a combustion supporting gas are appropriately arranged, that is known as a burner for heating inorganic powder. This oxygen combustion burner 20 has a straight rod shape, and a nozzle 22 in the leading edge portion of the burner is constituted by a fuel supply nozzle, a combustion support gas supply nozzle for primary combustion, a glass raw material particle supply nozzle and a combustion support gas supply nozzle for secondary combustion that are entirely arranged in a concentric form from the center toward the peripheral portion. From the nozzle 22, a flame F is blown downwardly and glass raw material particles (not shown) are supplied from the glass raw material particle supply nozzle by gas conveyance or mechanical conveyance into the flame F (that is the first gas phase portion). By this method, it is possible to securely change the glass raw material particles into liquid glass particles in a short time. Here, although not shown, a glass raw material particle supply line for supplying glass raw material particles to the glass raw material particle supply nozzle, a fuel supply line for supplying a fuel to the fuel supply nozzle, and a gas supply line for supplying a combustion support gas to the combustion support gas supply nozzle for primary combustion and the combustion support gas supply nozzle for secondary combustion, are connected to the oxygen combustion burner 20.

Thus, when the oxygen combustion burner 20 wherein the glass raw material particle feed portion is integrated with the heating means is employed, since the oxygen combustion burner 20 functions also as the glass raw material particle feed portion, it is not necessary to provide a glass raw material particle feed portion separately. However, a glass raw material particle feed portion for feeding glass raw material particles to the flame F of the oxygen combustion burner 20, may be separately provided so as to be adjacent to the oxygen combustion burner 20.

The heating means is not limited to the oxygen combustion burner 20, and a multiphase arc plasma generating apparatus constituted by at least one pair of electrodes for generating thermal plasma, may be employed, and both of the oxygen combustion burner 20 and the multiphase arc plasma generating apparatus may be provided in the melting tank 12. Further, the temperatures of the flame F and the thermal plasma are preferably set to be at least 1,600° C., that is higher than the melting temperature of silica sand, in order to quickly vaporize and dissipate a gas produced by quick decomposition of decomposable components (such as carbonates) contained in the glass raw material particles (hereinafter referred to as vaporization and dissipation) and to promote vitrification reaction together with other glass raw materials. By this method, the glass raw material particles fed in the furnace are quickly vaporized and dissipated by the flame F and/or the thermal plasma, and by the heat of high temperature, they become liquid glass particles and fall on the molten glass liquid G in the melting tank 12. Then, an upper layer of the molten glass liquid G formed by accumulation of the liquid glass particles is continuously heated by the flame F and/or the thermal plasma and by radiation heat from furnace wall.

By this method, the glass raw material particles fed in the furnace are quickly vaporized and dissipated by the heat of high temperature of the flame F and/or the thermal plasma, to be liquid glass particles, and the produced liquid glass particles fall on the bottom portion of the melting tank 12 to be a molten glass liquid G. Then, the liquid state of the molten glass liquid G formed by accumulation of the liquid glass particles is maintained because it is continuously heated by the flame F and/or the thermal plasma. Here, the central temperature of the flame F is about 2,000° C. in the case of oxygen combustion, and it is from 5,000 to 20,000° C. in the case of thermal plasma.

The average particle size (weight-averaged) of the glass raw material particles is preferably from 30 to 1,000 μm. More preferably, glass raw material particles having an average particle size (weight-averaged) within a range of from 50 to 500 μm are employed, and glass raw material particles within a range of from 70 to 300 μm are still more preferred. The average particle size (weight-averaged) of the liquid glass particles (a) that are produced by melting the glass raw material particles, is about 80% of the average particle size of glass raw material particles in most cases.

In the figure, particles 26 shown inside or under the flame F show particles that are glass raw material particles becoming to liquid glass particles or liquid glass particles. Since the glass raw material particles are considered to become liquid glass particles quickly in the flame, hereinafter the particles are also referred to as liquid glass particles 26.

By the way, the oxygen combustion burner 20 is disposed from the ceiling wall 18 so as to be tilted in an oblique downward direction, so as to blow glass raw materials in an oblique downward direction and to form a flame F in an oblique downward direction from a nozzle 22. Further, the oxygen combustion burner 20 is supported by a spherical bearing 28 provided through an opening of the ceiling wall 18, and the burner is rotated in a swing direction with respect to a vertical axis O by the spherical bearing 28. Accordingly, when the oxygen combustion burner is rotated around the vertical axis O by the moving means in a state that the oxygen combustion burner 20 is tilted, the nozzle 22 at the leading edge moves so as to draw a circle on a horizontal plane. Accordingly, a flame F (gas phase portion) formed at the leading edge of the nozzle 22 also moves so as to draw a circle on a horizontal plane.

As the flame F moves so as to draw a circle on the horizontal plane, the liquid glass particles 26 formed in the flame F fall along a circle around the vertical axis O, and fall on a surface of a molten glass liquid G under the circle. Namely, the falling position of the liquid glass particles 26 on the molten glass liquid surface changes with time in a doughnut-shaped falling area 30 indicated by double-dotted lines in FIG. 1. The upper end portion of the oxygen combustion burner 20 is connected via a spherical bearing 34 to a gear 32 rotated around the vertical axis O. The spherical bearing 34 is disposed at an eccentric position by a predetermined amount with respect to the vertical axis O. Further, a gear 36 is engaged with the gear 32, and the gear 36 is rotated by a motor 38. Further, the rotation speed of the motor 38 is controlled by a controller 40. By the moving means including the controller 40, the falling position of the liquid glass particles 26 onto the molten glass liquid G surface is changed to prevent generation of bubbles caused by involvement of a gas such as an air into the liquid glass particles 26 or the molten glass liquid G at the falling position of the liquid glass on the molten glass liquid G surface. In the control of the moving means, a surface of the molten glass liquid G is monitored by e.g. a TV camera attached to the ceiling wall, and based on an image showing generation state of bubbles, the rotation speed is determined. Further, based on the information of the image, the rotation speed can be appropriated changed.

Here, the tilting angle of the oxygen combustion burner depends on the size of the melting tank 12, and is appropriately determined according to the size. Further, the rotation mechanism of the oxygen combustion burner 20 is not limited to the above structure, but it may be any structure so long as that can rotate the oxygen combustion burner 20. Further, the time interval until generation of bubbles stops when liquid glass particles fall on the same position with a time difference, changes depending on the type of liquid glass particles, the feeding amount, the heating temperature by the oxygen combustion burner 20 and other condition of in-flight melting. Accordingly, as described above, the molten glass liquid G surface is appropriately observed to determine an optimum time interval to prevent involvement of a gas, and based on this time interval, the controller 40 controls the motor 38 to change the falling position of the liquid glass particles.

By this method, continuous falling of the liquid glass particles onto a particular position on the molten glass liquid surface is prevented, whereby it is possible to reduce the risk that a gas such as an air is involved into the molten glass liquid at the falling position of the liquid glass particles to form bubbles. Further, even when e.g. a residual gas is present in the liquid glass particles themselves, it is possible to maintain a time for e.g. the residual gas to escape from the liquid glass particles or from the molten glass liquid surface at a position to which the liquid glass particles fall, whereby residual bubbles of the e.g. residual gas in the molten glass liquid is reduced.

Next, the function of the glass-melting furnace having the above construction will be described.

While the oxygen combustion burner 20 is rotated by the motor 38, the glass raw material particles (not shown) are dropped, and the glass raw material particles are heated by a high-temperature gas phase atmosphere by a flame F of the oxygen combustion burner 20, to change them into liquid glass particles. The liquid glass particles 26, 26 . . . fall onto the molten glass liquid while the falling position is changed by the rotation of the oxygen combustion burner 20 to a falling area 30 indicated by the double-dotted line in FIG. 1.

In such an in-flight melting of glass raw material particles, the rotation speed of the oxygen combustion burner 20 is controlled by the controller 40 to a speed corresponding to the time that prevents a gas from being continuously involved into the liquid glass particles 26 and the molten glass liquid G at a particular falling position in the falling area 30 and generating bubbles.

By this method, in the melting tank 12 of this embodiment, by moving a nozzle 22 of the oxygen combustion burner 20 in substantially horizontal direction, a flame F (gas phase portion) formed at the leading edge of the nozzle 22 is moved in substantially horizontal direction. By this movement of the gas phase portion, the falling position of the liquid glass particles formed in the gas phase portion into the liquid is moved, whereby a gas such as an air is less likely to be involved into the molten glass liquid G at the falling position on the molten glass liquid. Further, even in a case where the gas such as an air is involved into the molten glass liquid G to form bubbles or a case where a residual gas remains as bubbles, a time to be degassed is easily maintained, whereby it is possible to produce a molten glass having a good quality with few bubbles.

Here, in this embodiment, the rotation speed of the oxygen combustion burner 20 is controlled according to the above time, but even in a case where the oxygen combustion burner is simply rotated without conducting time control, a sufficient effect of degassing can be obtained as compared with a conventional in-flight melting equipment wherein the falling position into the liquid is only one area.

Figure 3:
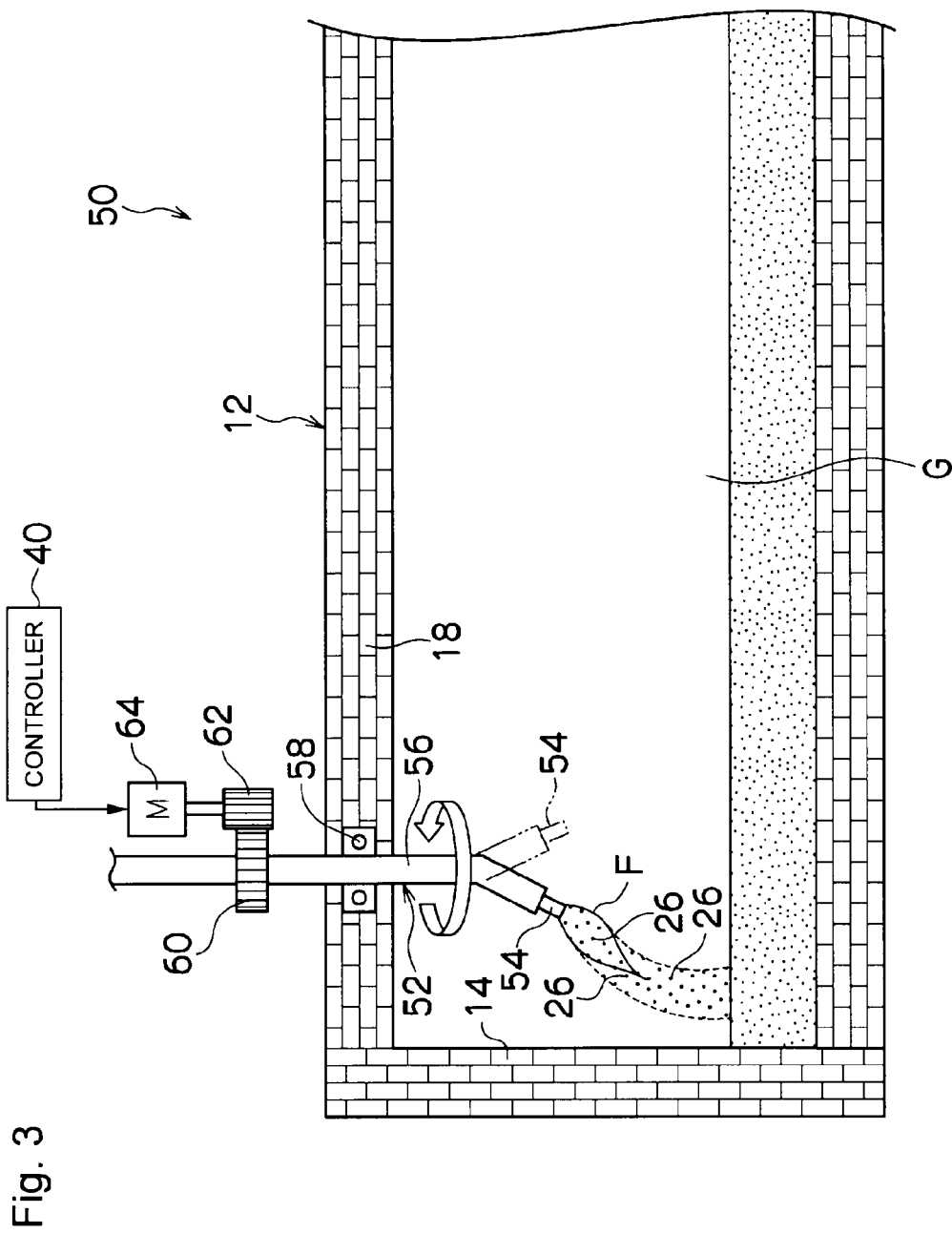
FIG. 3 is a vertical cross-sectional view of a glass-melting furnace of a second embodiment.

FIG. 3 is a vertical cross-sectional view of a glass-melting furnace 50 of a second embodiment, and members that are the same or similar to those of the glass-melting furnace 10 shown in FIGS. 1 and 2 are designated as the same symbols in the explanation.

An oxygen combustion burner 52 shown in FIG. 3 has substantially the same structure as that of the oxygen combustion burner 20, but its nozzle 54 is curved into an oblique downward direction, and is configured to blow glass raw materials (not shown) in an oblique downward direction from the nozzle 54 and to form a flame F in an oblique downward direction.

A straight tube portion 56 of the oxygen combustion burner 52 other than the nozzle 54 is disposed in the vertical direction, and the straight tube portion 56 is disposed in the vertical direction so as to penetrate through a ceiling wall 18 of a melting tank 12. Further, the straight tube portion 56 is provided to the ceiling wall 18 so as to be rotational via a bearing 58. Further, a gear 60 is provided in the upper end portion of the straight tube portion 56, a gear 62 is engaged with the gear 60, and the gear 62 is rotated by a motor 64. The rotation speed of the motor 64 is also controlled by the above controller 40.

Next, the function of the glass-melting furnace 50 having the above construction will be described.

While the oxygen combustion burner 52 is rotated by the motor 64, glass raw material particles are dropped and the glass raw material particles are heated by a high-temperature gas phase atmosphere of a flame F of the oxygen combustion burner 20, to change the particles into liquid glass particles. The liquid glass particles 26, 26 . . . are dropped so that the falling position is changed in a falling area (not shown) equivalent to the falling area 30 indicated by the double-dotted line of FIG. 1 by an oblique downward supplying function by the rotation of the nozzle 54.

In such an in-flight melting of glass raw material particles, the rotation speed of the oxygen combustion burner 52 is controlled by the controller 40 to a speed which prevents continuous involvement of a gas into liquid glass particles and molten glass liquid G at the same falling position in the falling area thereby to prevent formation of bubbles.

By this method, also in the melting tank 12 of FIG. 3, by the movement of the gas phase portion, falling position of liquid glass particles formed in the gas phase portion is moved. Accordingly, it is unlikely that a gas such as an air is involved in the molten glass liquid G at the falling position. Further, even in a case where a gas such as an air is involved in the molten glass liquid G to be bubbles or a case where a residual gas remain as bubbles, it is easy to maintain a time for degassing, whereby it is possible to produce a molten glass having a good quality with few bubbles.

Here, also in the melting tank 12, even a simple rotation of the oxygen combustion burner 52 without conducting time control, can provide a sufficient effect of degassing as compared with conventional in-flight melting equipment wherein the falling position is only one.

Further, in Examples of FIGS. 1 to 3, the oxygen combustion burner 20, 52 is moved in the upper portion of the melting tank 12 by rotating the oxygen combustion burner 20, 52, but the form of movement is not limited to rotation, but the movement form of the oxygen combustion burner may be a horizontal movement above and along the falling area 30. Further, the shape of the falling area 30 is not limited to a doughnut shape, but it may be an elliptical shape or a rectangular shape. Further, by changing the rotation speed of the oxygen combustion burner 20, 52, it is possible to change the distance of the falling position of the liquid glass particles from the rotation axis by the function of centrifugal force. Further, by changing the speed of a combustion gas blown from the rotating oxygen combustion burner 20, 52, it is possible to change the horizontal speed of liquid glass particles accompanying the combustion gas, thereby to change the distance of the falling position of the liquid glass particles from the rotation axis.

Figure 4:
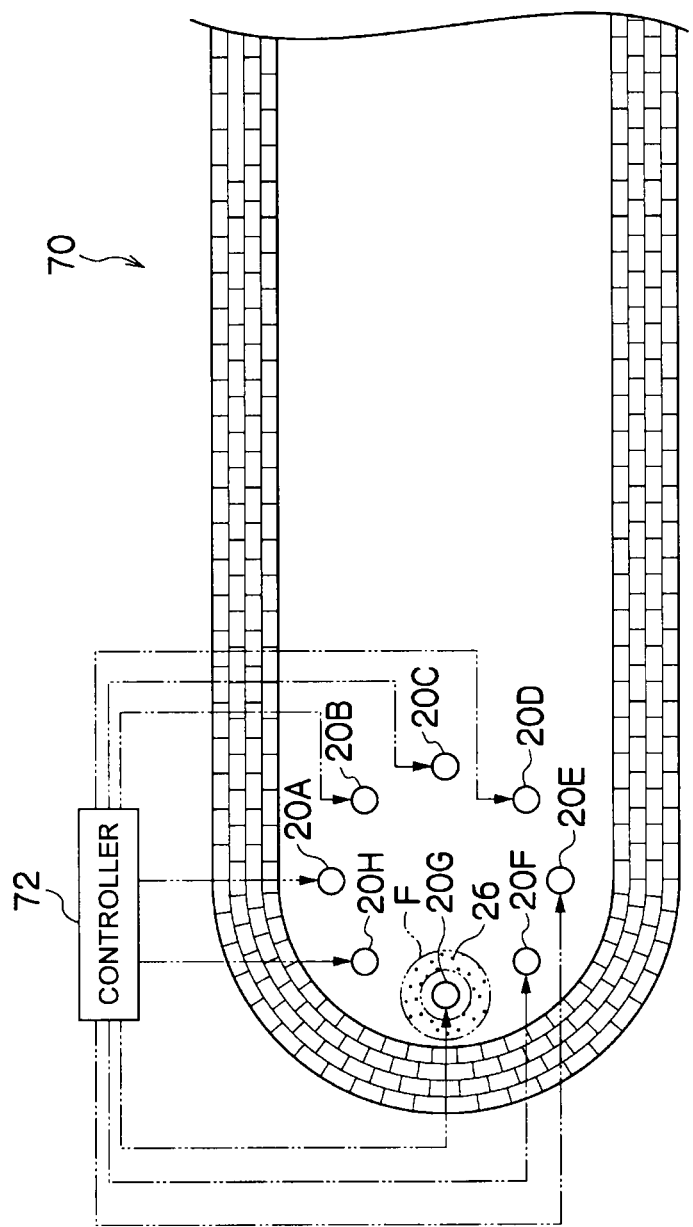
FIG. 4 is a substantial-part plan view of a glass-melting furnace of a third embodiment.
Figure 5:
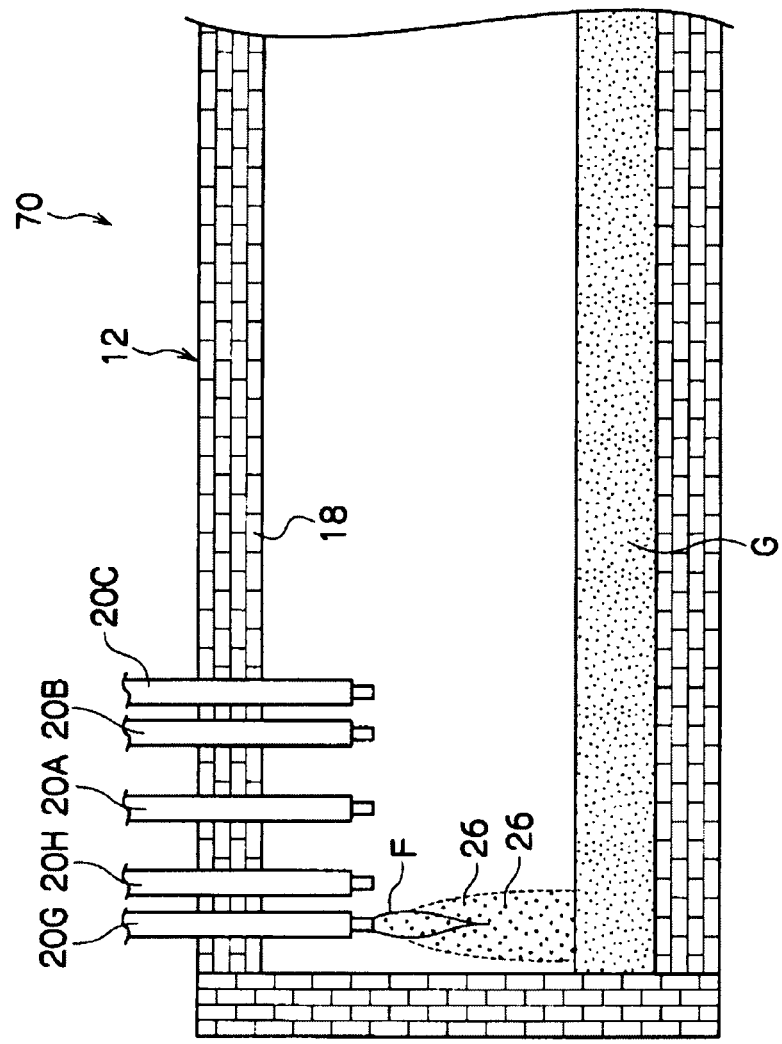
FIG. 5 is a vertical cross-sectional view of the glass-melting furnace shown in FIG. 4.

FIG. 4 is a substantial-part plan view of a glass-melting furnace 70 of a third embodiment and FIG. 5 is a vertical cross-sectional view of the glass-melting furnace 70, wherein members that are the same or similar to those of the glass-melting furnace 10 shown in FIGS. 1 and 2 are indicated by the same symbols in the explanation.

In a melting tank 12 of this glass-melting furnace 70, a plurality of (8 in FIG. 4) straight rod-shaped oxygen combustion burners 20A to 20H are provided so as to vertically penetrate through a ceiling wall 18. These oxygen combustion burners 20A to 20H are disposed along a concentric circle around the center of an arc shape of an upstream side wall face 14 having a semicircular shape, with predetermined intervals (disposed at respective positions on a substantially horizontal plane). Further, this melting tank 12 is provided with a controller (operation controller) 72, and this controller 72 makes these oxygen combustion burners 20A to 20H operate in a predetermined order so as to prevent generation of bubbles at the falling position of the liquid glass particles 26.

Next, the function of the glass-melting furnace 70 having the above construction will be described.

For example, the controller 72 makes the oxygen combustion burners 20A to 20H operate sequentially in the order of oxygen combustion burner 20A→20B→20C→20D→20E→20F→20G→20H→20A . . . with time intervals so as to prevent bubbles from generating at falling positions on a surface of a molten glass liquid G under these oxygen combustion burners.

By this method, with this melting tank 12, continuous falling of liquid glass particles in a particular position of the molten glass liquid surface is prevented, to reduce the risk that a gas such as an air is involved in the molten glass liquid at a falling position of the liquid glass particles to form bubbles in the molten glass liquid. Further, even if e.g. a residual gas remaining in the liquid glass particles themselves is present, it is possible to obtain a time for e.g. the residual gas to dissipate from the liquid glass particles or from the molten glass liquid surface at a position to which the liquid glass particles fell, whereby bubbles of e.g. the residual gas remaining in the molten glass liquid decreases.

Here, the order of operation of the oxygen combustion burners 20A to 20H is not limited to the above order, and for example, the order may be 20A→20C→20E→20G→20B→20D→20F→20H→20A . . . , or it may be 20A→20E→20C→20G→20B→20E→20D→20H→20A . . . . Namely, the order may be any order so long as it prevents involvement of a gas at a particular falling position of the liquid glass particles and consequent generation of bubbles.

Figure 6:
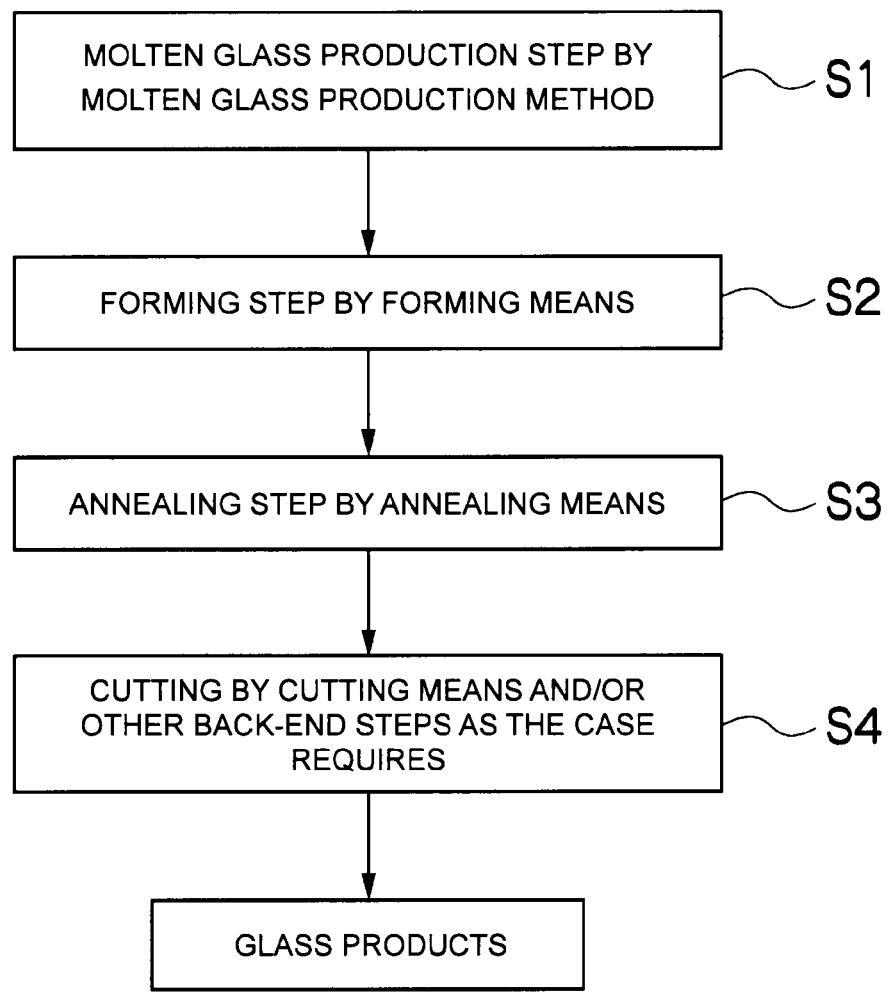
FIG. 6 is a flowchart showing the process for producing glass products of an embodiment.

FIG. 6 is a flowchart showing the embodiment of the process for producing glass products. FIG. 6 shows constituent features of the process for producing glass products, that are a glass melting step (S1), a forming step (S2) by a forming means, an annealing step (S3) by an annealing means, and a cutting step and other back-end steps (S4) to be carried out as the case requires.

A molten glass liquid G produced in the melting tank 12 shown in FIGS. 1 to 5 is conveyed through an outlet and a conduit structure, not shown, to a forming means and is formed (forming step). The formed glass is annealed by an annealing means (annealing step) to prevent residual stress from remaining inside a solidified glass after formation. Further, the glass is cut (cutting step) and subjected to other back-end steps as the case requires, to be glass products. Here, the forming step (S2), the annealing step (S3), the cutting step or other back-end steps (S4) may be any steps so long as they can achieve the purposes.

For example, in a case of plate glass, the molten glass liquid G is formed into a glass ribbon by a forming means, it is annealed by an annealing means, cut into a desired size, and subjected to a back-end step such as a grinding step of glass ends to obtain a plate glass.

The molten glass G produced by the process for producing molten glass of the present invention, is not limited in the composition so long as the molten glass is one produced by in-flight heating melting method. Accordingly, it may be soda lime glass or borosilicate glass. Further, the application of the glass products to be produced is not limited to architecture and vehicle applications, and it may be flat panel display application or other various types of applications.

In a case of soda lime glass to be used for a plate glass for architecture or vehicle application, the glass preferably has a composition that $SiO_2$: 65 to 75%, $Al_2O_3$: 0 to 3%, CaO: 5 to 15%, MgO: 0 to 15%, $Na_2O$: 10 to 20%, $K_2O$: 0 to 3%, $Li_2O$: 0 to 5%, $Fe_2O_3$: 0 to 3%, $TiO_2$: 0 to 5%, $CeO_2$: 0 to 3%, BaO:

0 to 5%, SrO: 0 to 5%, $B_2O_3$: 0 to 5%, ZnO: 0 to 5%, $ZrO_2$: 0 to 5%, $SnO_2$: 0 to 3%, and $SO_3$: 0 to 0.5% in terms of mass percentage of oxide.

In a case of alkali-free glass to be employed for a substrate of liquid crystal display or organic EL display, the glass preferably has a composition that $SiO_2$: 39 to 70%, $Al_2O_3$: 3 to 25%, $B_2O_3$: 1 to 20%, MgO: 0 to 10%, CaO: 0 to 17%, SrO: 0 to 20% and BaO: 0 to 30% in terms of mass percentage of oxide.

In a case of mixed alkali glass to be employed for a substrate for plasma display, the glass preferably has a composition that $SiO_2$: 50 to 75%, $Al_2O_3$: 0 to 15%, MgO+CaO+SrO+BaO+ZnO: 6 to 24% and $Na_2O+K_2O$: 6 to 24% in terms of mass percentage of oxide.

As another application, in a case of a borosilicate glass to be used for e.g. a heat-resistant container or laboratory equipment, the glass preferably has a composition that $SiO_2$: 60 to 85%, $Al_2O_3$: 0 to 5%, $B_2O_3$: 5 to 20% and $Na_2O+K_2O$: 2 to 10% in terms of mass percentage of oxide.

INDUSTRIAL APPLICABILITY

Molten glass produced by the present invention is formed into various types of glass products by a forming means such as a float bath, a fusion forming machine, a roll out forming machine, a blow forming machine or a press-forming machine.

This application is a continuation of PCT Application No. PCT/JP2010/063722, filed Aug. 12, 2010, which is based upon and claims the benefit of priority from Japanese Patent Application No. 2009-188348 filed on Aug. 17, 2009. The contents of those applications are incorporated herein by reference in its entirety.

REFERENCE SYMBOLS

F: flame, G: molten glass, 10: glass-melting furnace, 12: melting tank, 14: upstream side wall face, 16: glass raw material particle heating unit (glass raw material particle feed portion and heating means for forming gas phase portion), 18: ceiling wall, 20: oxygen combustion burner, 20A to 20H: oxygen combustion burner, 22: nozzle, 26: liquid glass particles, 28: spherical bearing, 30: falling area, 32: gear, 34: spherical bearing, 36: gear, 38: motor, 40: controller, 50: glass-melting furnace, 52: oxygen combustion burner, 54: nozzle, 56: straight tube portion, 58: bearing, 60: gear, 62: gear, 64: motor, 70: glass-melting furnace, 72: controller

What is claimed is:

1. A process for producing molten glass, which is a process of changing glass raw material particles into liquid glass particles in a gas phase atmosphere in a glass-melting furnace and accumulating the liquid glass particles in a bottom portion of the glass-melting furnace to obtain a molten glass liquid; the process comprising:
supplying the glass raw material particles downwardly from a furnace wall portion in an upper portion of the glass-melting furnace to let the particles pass through a gas phase portion formed by a heating means, to change the particles into liquid glass particles; and
changing with time the position of the gas phase portion in substantially horizontal direction and thereby changing with time the falling position of the liquid glass particles formed in the gas phase portion on the molten glass liquid surface.

2. The process for producing molten glass according to claim 1, wherein the heating means is an oxygen combustion burner producing an oxygen combustion flame or a multi-phase arc plasma generation apparatus constituted by at least a pair of electrodes producing thermal plasma.

3. The process for producing molten glass according to claim 1, which comprises moving the heating means in substantially horizontal direction.

4. The process for producing molten glass according to claim 1, wherein the heating means is an oxygen combustion burner constituted by a combustion gas supply tube, an oxygen tube and a glass raw material particle supply tube, that are coaxially arranged; the process comprising moving the outlet of the oxygen combustion burner in substantially horizontal direction.

5. The process for producing molten glass according to claim 1, which employs a plurality of heating means for forming gas phase portions at respective positions in the horizontal direction, and which comprises operating the heating means at different timings.

6. A process for producing glass products comprising a step of producing molten glass by the process for producing molten glass as defined in claim 1, a step of forming the molten glass, and a step of annealing the formed glass.

* * * * *